United States Patent
Szeto

(10) Patent No.: US 9,684,612 B1
(45) Date of Patent: Jun. 20, 2017

(54) MOBILE DEVICE CAPABLE OF DETERMINING SPATIAL RELATIONSHIPS AND METHODS

(71) Applicant: Nanoport Technology Inc., Markham (CA)

(72) Inventor: Timothy Jing Yin Szeto, Markham (CA)

(73) Assignee: Nanoport Technology Inc., Markham (CA)

( * ) Notice: Subject to any disclaimer, the term of this patent is extended or adjusted under 35 U.S.C. 154(b) by 0 days.

(21) Appl. No.: 15/013,750

(22) Filed: Feb. 2, 2016

(51) Int. Cl.
    *G06F 13/22*     (2006.01)
    *G06F 13/42*     (2006.01)
    *G06F 13/40*     (2006.01)

(52) U.S. Cl.
    CPC .......... *G06F 13/22* (2013.01); *G06F 13/4068* (2013.01); *G06F 13/4282* (2013.01)

(58) Field of Classification Search
CPC ... G06F 13/22; G06F 13/4068; G06F 13/4282
See application file for complete search history.

(56) References Cited

U.S. PATENT DOCUMENTS

| | | | | |
|---|---|---|---|---|
| 7,322,873 B2* | 1/2008 | Rosen | ................... | A63H 33/042 446/124 |
| 9,158,135 B1 | 10/2015 | Chaboud et al. | | |
| 9,158,333 B1* | 10/2015 | Froment | ........... | H04M 1/72527 |
| 2008/0012702 A1* | 1/2008 | Feight | ...................... | G01D 3/08 340/539.22 |
| 2008/0157957 A1* | 7/2008 | Pitchers | ............. | H05B 37/0272 340/539.1 |

(Continued)

FOREIGN PATENT DOCUMENTS

WO      2015/070321 A1      5/2015

OTHER PUBLICATIONS

Radle et al, "Spatially-aware or spatially-agnostic? Elicitation and Evaluation of User-Defined Cross-Device Interactions," Proceedings of the SIGCHI Conference on Human Factors in Computing Systems, 2015.*

(Continued)

*Primary Examiner* — Henry Tsai
*Assistant Examiner* — John Roche

(57) ABSTRACT

A mobile device having a plurality of connectors each for interconnecting with another device of a plurality of other devices, each of the plurality of connectors located in a defined relative physical location on the mobile device and each of the plurality of connectors configured to provide an indication of when a connection to one of the other devices is made or lost. The mobile device further includes a processor and a memory such that the memory stores instructions that cause the processor to: maintain a data store that indicates connectivity information for each of the other devices that are interconnected to the mobile device. The processor is further configured to determine a relative spatial location of each of the other interconnected devices relative to the mobile device based on the relative physical location of the plurality of connectors and the connectivity information; and update the data store to reflect when connection to one of the other devices by way of one of the plurality of connectors is made or lost.

26 Claims, 13 Drawing Sheets

(56) References Cited

U.S. PATENT DOCUMENTS

2012/0200173 A1    8/2012   Liu et al.
2013/0273752 A1   10/2013   Rudisill et al.
2015/0065069 A1    3/2015   McCormack et al.

OTHER PUBLICATIONS

"Huddle Lamp—Spatially-Aware Mobile Displays," retrieved from http://huddlelamp.org, accessed on Feb. 1, 2016.
"Close Capacitive Coupling Communication Physical Layer (CCCC. PHY)," Ecma International, 2011.
"TC47—Near Field Communications," retrieved from http://www.ecma-international.org/memento/TC47-M.htm, accessed on Feb. 1, 2016.
"Keyssa", retrieved from http://keyssa.com, accessed on Feb. 1, 2016.
International Search Report and Written Opinion mailed Apr. 20, 2017 in PCT Application No. PCT/CA2017/050111, filed on Feb. 1, 2017.

\* cited by examiner

MOBILE DEVICE CAPABLE OF DETERMINING SPATIAL RELATIONSHIPS AND METHODS

FIELD

The following relates to mobile devices capable of determining spatial relationships to interconnected mobile devices, and methods.

BACKGROUND

Mobile computing devices (e.g. mobile phones, tablets, laptop computers, etc.) are usually provided with a plurality of connection options which allow the devices to communicate with other devices electronically, or to receive or supply energy to the other devices (including obtaining energy from a power supply), or to add functionality to the device, such as to connect the device to a peripheral device (e.g. a keyboard, a mouse, speakers, etc.).

Generally, spatial awareness is the ability (e.g. for a device) to be spatially aware and have knowledge of one more spatial features (e.g. location, orientation, etc.) of other devices in relation to the device. This spatial awareness can be used to facilitate input gestures that span across multiple devices or the stitching of multiple displays to create larger displays. Spatial awareness also involves understanding the relationship of these interconnected devices when there is a change of position relative to the device.

Current methods for assessing spatial awareness may rely on an external camera to detect the spatial relationships between devices. These solutions are complex, need specialized environments and often rely on external devices such as cameras and/or sensors. Such solutions can be an impediment to the usability of the mobile computing device as they require external devices and/or specialized environments which are inhibiting for users who wish to easily interconnect their devices to one another while allowing spatial awareness of the interconnected devices.

In other methods, location information (e.g. GPS coordinates and wireless signal strength) can be used to detect when devices are located near one another but the information is often not sufficiently accurate to determine relative spatial locations of devices that are located near one another.

Accordingly, there exists a need for new methods and/or devices that can detect spatial relationships between connected mobile devices.

SUMMARY

According to an aspect, there is provided a mobile device comprising: a plurality of connectors each for interconnecting with another device of a plurality of other devices, each of the plurality of connectors located in a defined relative physical location on the mobile device and each of the plurality of connectors configured to provide an indication of when a connection to one of the other devices is made or lost; a processor and a memory, the memory storing instructions that cause the processor to: maintain a data store that indicates connectivity information for each of the other devices that are interconnected to the mobile device; determine a relative spatial location of each of the other interconnected devices relative to the mobile device based on the relative physical location of the plurality of connectors and the connectivity information; and update the data store to reflect when connection to one of the other devices by way of one of the plurality of connectors is made or lost.

According to another aspect, there is provided a computer-implemented method of detecting a relative spatial location between a mobile device and another device of a plurality of other devices connected to the mobile device, the method comprising: sensing at a particular connector of a plurality of connectors on the mobile device, connectivity of the particular connector with a corresponding connector of said another device, the particular connector of said plurality of connectors located in a defined relative physical location on the mobile device; and subsequent to said sensing of connectivity, updating connectivity information in a data store for the mobile device to indicate a connection made or lost with the particular connector, wherein the connectivity information is configured for determination of the relative spatial location of said particular device relative to the mobile device.

According to yet another aspect, there is provided a computer-implemented method comprising: sensing, at a mobile device, when connection between the mobile device and another device is made or lost, wherein the mobile device comprises a plurality of connectors for interconnecting with respective connectors of said another device of a plurality of other devices and the plurality of connectors are each located in a defined relative physical location on the mobile device; maintaining a data store that indicates connectivity information for each of the other devices that are interconnected to the mobile device; determining a relative spatial location of each of the other interconnected devices relative to the mobile device based on the defined relative physical location of the plurality of connectors and the connectivity information; and updating the data store to reflect when connection to one of the other devices by way of one of the plurality of connectors is made or lost.

Other features will become apparent from the drawings in conjunction with the following description.

BRIEF DESCRIPTION OF THE DRAWINGS

Embodiments will now be described by way of example only with reference to the appended drawings wherein.

DETAILED DESCRIPTION

Figure 1:
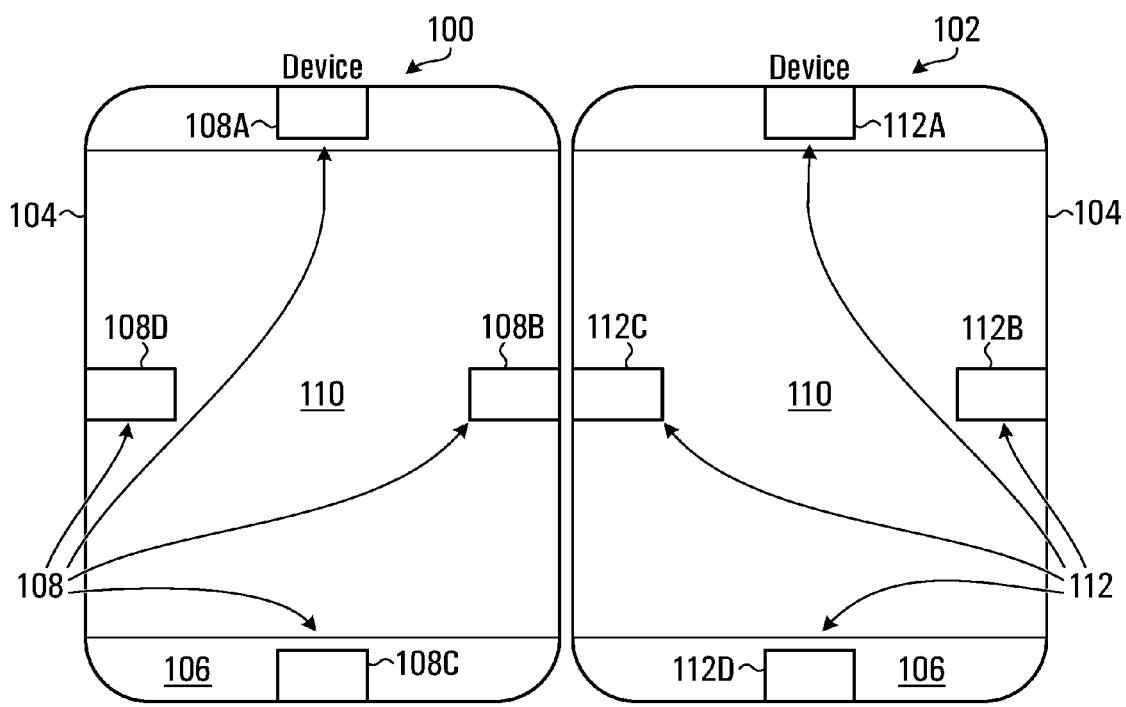
FIG. 1 is a schematic block diagram of a pair of mobile computing devices located in proximity to one another to establish connectivity and to allow one mobile computing device to determine spatial location of the other, according to an embodiment.

For convenience, like reference numerals in the description refer to like elements in the drawings.

Referring to FIG. 1, a pair of computing devices 100 and 102, each include a housing 104 defined by respective external surfaces 106. Devices 100, 102 can be any suitable electronic devices that interface with one another and provide complementary functions as described herein. At least one of devices 100, 102 may be a mobile computing device. For clarity in the discussion below, mobile computing devices are commonly referred to as "mobile devices" or "devices" for brevity.

Examples mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities. In at least some embodiments, mobile devices as referred to herein can also include without limitation, peripheral devices such as displays, printers, touchscreens, projectors, digital watches, cameras, digital scanners and other types of auxiliary devices that may communicate with another computing device.

In one example, each of devices 100, 102 may be a smartphone, or one may be a smartphone and the other a peripheral device (e.g. a speaker, a keyboard, a display screen, a camera). In another example, one device may be a touchscreen enabled device and the other a type of communication device (e.g. a router) for connecting to other devices. As will be apparent, other types of computing devices 100 and 102 can be envisaged that benefit from interconnection and interoperability.

Further, in the depicted embodiment, devices 100 and 102 may be of the same type—generally identical in structure and components. In other embodiments exemplified below, device 100 (or a similar device) may communicate with other different yet compatible devices, in a manner exemplified herein.

Each of devices 100, 102 may include an input interface such as a touch display 110 that as will be described will cooperate to work together with one another when the spatial locations of devices is established relative to one another (e.g. to provide one larger touch screen). Thus, the larger interconnected screen allows input to be received on either one of touch display 110 of devices 100, and 102.

Each of devices 100 and 102 includes respective connectors 108 and 112 for allowing connection between the devices. In the example illustrated in FIG. 1, device 100 includes four connectors 108A, 108B, 108C, 108D (individually and collectively connector(s) 108) and device 102 includes four connectors 112A, 112B, 112C, 112D (individually and collectively connector(s) 112).

Connectors 108 and connectors 112 may for example be physical connectors to a serial communications port, such as a universal serial bus (USB) port, or the like. In a particular embodiment, connectors 108 and connectors 112 may be magnetic connectors, as detailed in PCT Publication No. WO 2015/070321, the contents of which are hereby incorporated by reference.

Figure 9:
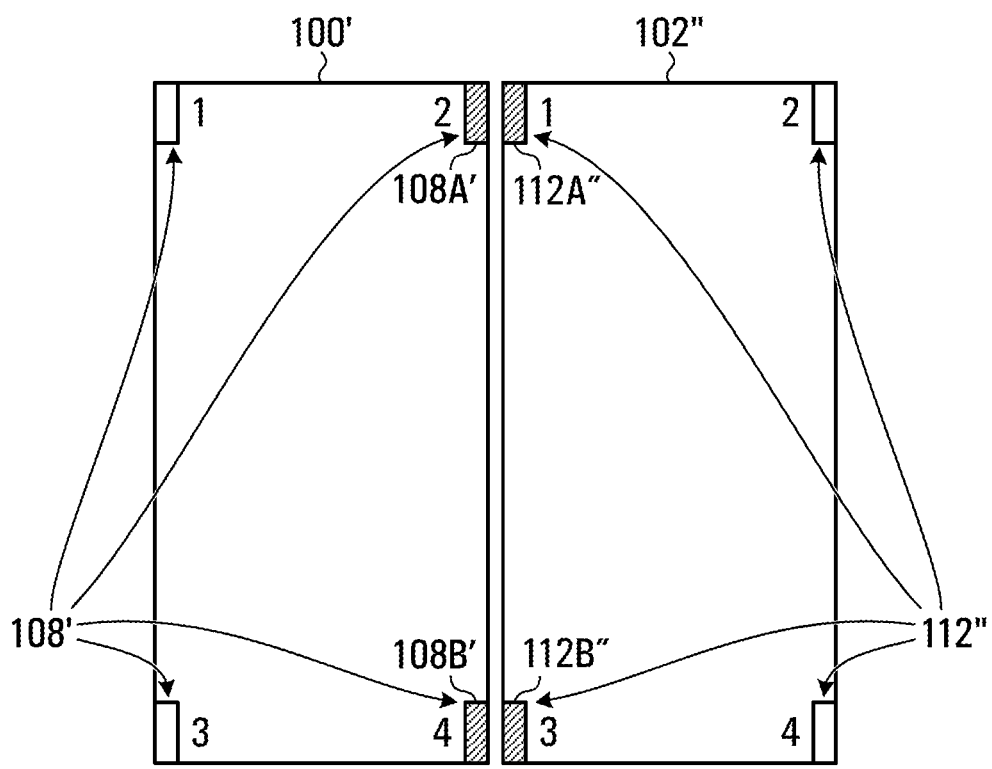

Although connectors 108 and 112 have been shown to be provided the centre of the top, bottom, left and right edges of devices 100 and 102, other locations of connectors 108 and 112 may be envisaged. For example, the connectors on each of the devices 100 and 102 can be located at the corners of the devices. Such exemplary arrangement of the connectors is shown in FIG. 9. Additionally, although four connectors have been shown, the number of connectors provided on devices 100 and 102 may be varied.

In the example of FIG. 1, connectors 108B and 112C are physically (e.g. mechanically) connected to one another in a side by side arrangement. In addition to the physical/mechanical connection, devices 100 and 102 are in data communication with one another. Such data communication is provided as a result of at least one of the following:

1. Communication as a result of electrical conduction of signals between electrical contacts of the respective interconnected connectors (e.g. connectors 108B and 112C). This type of communication may be provided as a USB compatible bus is established through the interconnected device connectors (e.g. 108B and 112C).

2. Short range wireless communication established as a result of the proximity of the device 100 to the device 102. Typically, such short range wireless communication is provided when electronic connector elements that may be provided within the respective connectors 108/112, on the devices 100/102 are located within a short range of one another (e.g. a few mm). The connector elements typically include contactless connector units for transmitting and receiving extremely high frequency (EHF) signals. An example of such EHF communications is described in http://keyssa.com and U.S. Patent Publication No. 2015/0065069, both of which are hereby incorporated in their entirety.

3. Longer range wireless communication for exchanging data between devices 100 and 102. Such longer range wireless communications techniques include but are not limited to: Wi-Fi, Bluetooth, Wireless USB, and capacitive coupling communications. An example of capacitive coupling communications is described in: http://www.ecma-international.org/memento/TC47-M.htm, incorporated herein by reference.

Once a mechanical/physical connection is established between respective connectors (e.g. 108B, 112C), the devices 100, 102 can sense the physical connection (e.g. directly via the connectors and/or with external sensors). In the embodiments where the connectors provide a mechanical connection and data connectivity, a change in the electrical characteristics at the electrical contacts of the respective interconnected connectors (e.g. connectors 108B and 112C) such as but not limited to: a change in voltage, impedance, etc., can be used to indicate a physical coupling of the respective connectors (e.g. 108B and 112C).

In another embodiment, where the devices 100/102 communicate using extremely short range wireless communication, the devices 100/102 can detect an EHF signal (e.g. received from an interconnected device 102 at the device 100) which can be used to indicate that the electronic connector elements (e.g. as contained within connectors 108B, 112C) are located within a few mm of one another.

In some embodiments, sensors located on devices 100/102 can be used for detecting magnetic field of one or more magnets in a proximate connector 108/112 (e.g. a Hall Effect sensor). The sensors may be integrated within each of the connectors 108, 112 or provided as a separate external component. Alternatively, if a connector (e.g. 108B) includes a moveable magnetic element, then a pressure sensor (not shown) can be used to detect attractive force of another connector (e.g. 112C) on that element and thereby detect a mechanical connection of the connectors 108B and 112C.

As will be described, an indication of the physical/mechanical connectivity of devices 100 and 102 via one or more connectors 108, 112 can trigger a first device 100 to determine the relative spatial location of an interconnected device 102 relative to the first device 100.

Figure 12:
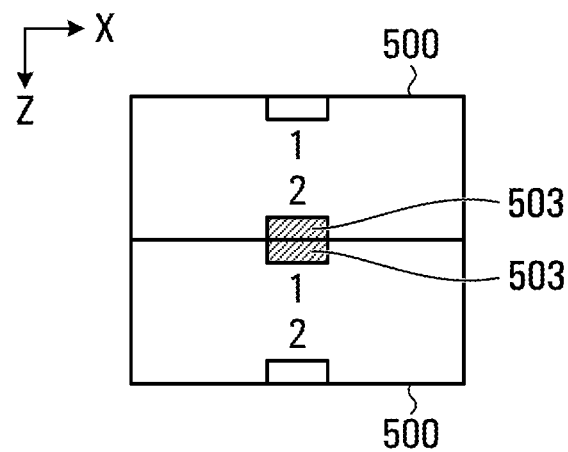

In another example, connectors 108/112 of respective devices may be located on top of one another in a manner that allows communication between the interconnected devices (e.g. see FIGS. 12 and 13).

In some embodiments, connectors 108 and 112 include magnets utilized to physically connect the devices 100 and 102 both mechanically and electrically (as discussed in PCT Publication No. WO 2015/070321). In another embodiment, at least some of connectors 108 may be adapted to physically mate with particular ones of respective connectors 112 such that when mated, connectors 108 and 112 allow the interconnected devices 100 and 102 to connect both mechanically and electrically. In this embodiment, connectors 108 may allow the device 100 to transfer or receive power and data to or from interconnected devices such as device 102. However, in other embodiments, as discussed above, although a mechanical connection exists between the connectors 108 and 112, data communication may be established by short-range electromagnetic signals as long as short range wireless data communication circuits (e.g. contactless communication units) within the devices 100 and 102 are located within a certain proximity to one another.

Generally, the short range wireless data communication circuits may be integrated within respective connectors 108 and 112 or as a separate communication circuit within device 100 and 102 which may be in communication with the connectors 108 and 112.

In one embodiment, the short range wireless communication circuits may be integrated within the connectors 108 and 112 such that in use, once at least one of connectors 108 of the first device 100 is located in close proximity to respective connector(s) 112 on the second device 102, then a data connection is established therebetween (e.g. connector 108B on device 100 located a few mm from connector 1112C on device 102). As will be envisaged, other types of very short range communication types (e.g., capacitive coupling communication) may be used.

Each of connectors 108 may be configured to sense connectivity between the first device 100 and connector on another device—for example a respective connector 112 on second mobile device 102. Alternative or additionally, connectors 108 may be supplemented by various other proximity sensors (e.g. for detecting ferrous or magnetic bodies) for detecting a physical/mechanical connection between the connectors 108 and 112.

As will be discussed, device 100 maintains connectivity information for each of its connectors 108 in a data store that may be used to determine spatial awareness about devices (e.g. device 102) that are interconnected (e.g. mechanically and/or electrically and/or wirelessly) to device 100. The connectivity information for mobile device 100 can include information about whether a connection exists for each connector 108 on mobile device 100 with another device (e.g. device 102); the defined relative physical location of each of connectors 108 on device 100 (e.g. x, y parameters relative to the device; general location descriptors such as top, bottom, left, right). Additionally, this connectivity information may optionally be augmented with more specific information about interconnected devices (e.g. size of any interconnected device, type of device, device identification information, location of connectors on an interconnected device, and devices interconnected with an interconnected device, etc.).

Based on connectivity information, device 100 can determine the relative spatial location of one or more interconnected devices (e.g. device 102 is connected on the right side of device 100). This spatial awareness about interconnected device(s) that are connected to first device 100 is further discussed with respect to the modules shown in FIG. 3 and the flow chart shown in FIGS. 4 and 5.

In one embodiment, once a connection is established between respective connectors 108, 112 of devices 100, 102 and the relative spatial location of the interconnected mobile device 102 is determined relative to the first mobile device 100, the spatial awareness may be used to facilitate cross-device interaction. Examples of cross-device interaction can include an input gesture spanning across both devices 100, 102 or stitching together displays 110 to create a larger display for rendering graphics (e.g. that allows device 100 to render graphics on the displays 110 and/or input interfaces on multiple interconnected devices such as 100 and 102 to work together).

As will also be discussed in further detail, once devices 100 and 102 are connected to one another, and device 100 has determined the relative spatial location of the device 102, devices 100 and 102 can communicate with one another and exchange information as needed (e.g. the device 100 may request additional information from device 102 to augment connectivity information and the spatial awareness for device 102, as discussed further in FIG. 6A).

Figure 2:
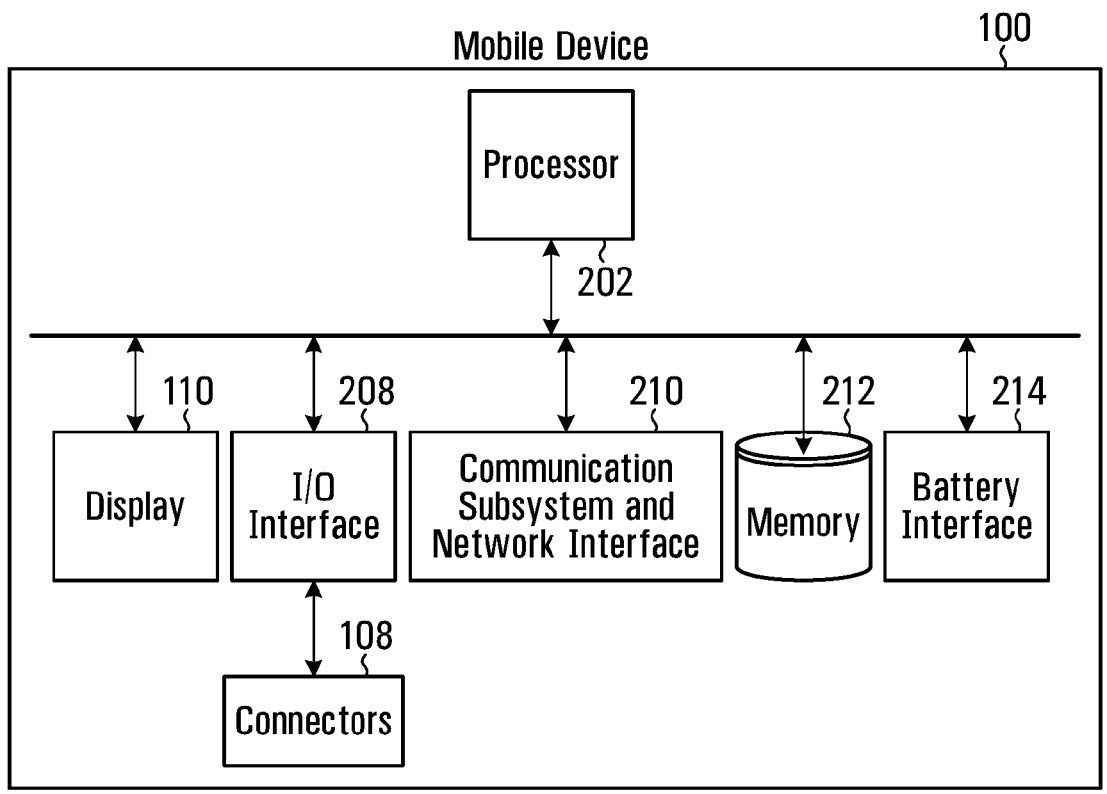
FIG. 2 is a block diagram of example hardware components of a first mobile computing device of FIG. 1, according to an embodiment.

FIG. 2 is a block diagram of a mobile device 100, according to an example embodiment. Mobile device 100 includes a processor 202, a display 110, an I/O interface 208, connectors 108, a communication subsystem and network interface 210 which allows communication to external devices (e.g. interconnected devices such as device 102), a memory 212 and a battery interface 214.

Processor 202 controls the overall operation of mobile device 100. Communication functions, including data and voice communications, are performed through a communication subsystem and network interface 210. Communication subsystem and network interface 210 enables device 100 to communicate with other devices (e.g. device 102). In some embodiments, device 100 may communicate with device 102 via connectors 108 by way of a bus or point to point communications (as shown in FIG. 2). Additionally, device 100 may further communicate with device 102 via the communication subsystem and network interface 210. In other embodiments, the connectors 108 provide a mechanical/physical connection and the data communication between devices 100 and 102 is established instead via the communication subsystem and network interface 210 (e.g. using wireless communications such as Wi-Fi, Bluetooth, Wireless USB, capacitive coupling communications). In this embodiment, the connectors 108 may not be connected to the I/O interface 208 (not shown). In addition to establishing data communication between the devices 100, 102 and communicating regarding whether device 100 is interconnected to device 102, wireless data communication can also be used to share connectivity information (e.g. for establishing data communications) prior to any mechanical connections being made.

In one example, connectors 108 of device 100 may utilize communication subsystem 210 to receive messages from and send messages to interconnected devices (e.g. request and receive additional spatial information from interconnected devices, such as from device 102). Accordingly, in one embodiment, device 100 can communicate with other interconnected devices using a USB or other direct connection, as may be established through connectors 108/112. In another embodiment, device 100 communicates with interconnected devices (e.g. device 102) using Bluetooth, NFC, or other types of such wireless communications as envisaged by a person skilled in the art.

Memory 212 may include a suitable combination of any type of electronic memory that is located either internally or externally such as, for example, flash memory, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

I/O interface 208 enables device 100 to communicate via connectors 108, e.g., to exchange data and establish communication with other devices 102. I/O interface 208 may also enable device 100 to interconnect with various input and output peripheral devices. As such, device 100 may include one or more input devices, such as a keyboard, mouse, camera, touch screen (e.g. display 110), a microphone, and may also include one or more output devices such as a display screen (e.g. display 110) and a speaker.

Mobile device 100 is typically a battery-powered device and includes a battery interface 214 for receiving one or more batteries (typically rechargeable). In at least some examples, the battery can be a smart battery with an embedded microprocessor.

Device 100 may be adapted to operate in concert with one or more interconnected devices (e.g. device 102). In particular, device 100 includes an operating system and software components, which are described in more detail below. Device 100 may store the operating system and software code in memory 212 and execute that software code at processor 202 to adapt it to operate in concert with one or more interconnected devices (e.g. device 102). The software code may be implemented in a high level procedural or object oriented programming or scripting language, or a combination thereof. The software code may also be implemented in assembly or machine language. The operating system may allow basic communication and application operations related to the mobile device. Generally, the operating system is responsible for determining the functions and features available on device 100, such as keyboards, touch screen, synchronization with applications, email, text messaging and other communication features as will be envisaged by a person skilled in the art.

As exemplified in PCT Publication No. WO 2015/070321, device 100 and interconnected devices (e.g. device 102) may each store software code which when executed, provides a coordinator at each of devices 100, 102 which performs various functions, including detection and registration of devices connected to each of devices 100, 102. Additionally, the coordinator of each device 100, 102 coordinates task sharing between devices and task assignment from one device (e.g. device 100) to another (e.g. device 102). The coordinator may also coordinate data transfer between the devices 100, 102. Thus, a coordinator at a first device 100 can communicate with a coordinator at other devices (e.g. device 102) by way of a bus or a network or both (not shown). By way of these communications, the respective coordinators of the devices 100, 102 may establish a peer to peer relationship or a master-slave relationship, depending on the nature of the desired communication as may be established between device 100 and/or interconnected devices 102.

Those skilled in the art will appreciate that portions of the operating system and the software components, such as specific device applications, or parts thereof, may be temporarily loaded into a volatile store forming part of memory 212. Memory 212 or a portion thereof may be on processor 202. Other software components can also be included, as is well known to those skilled in the art.

Figure 3:
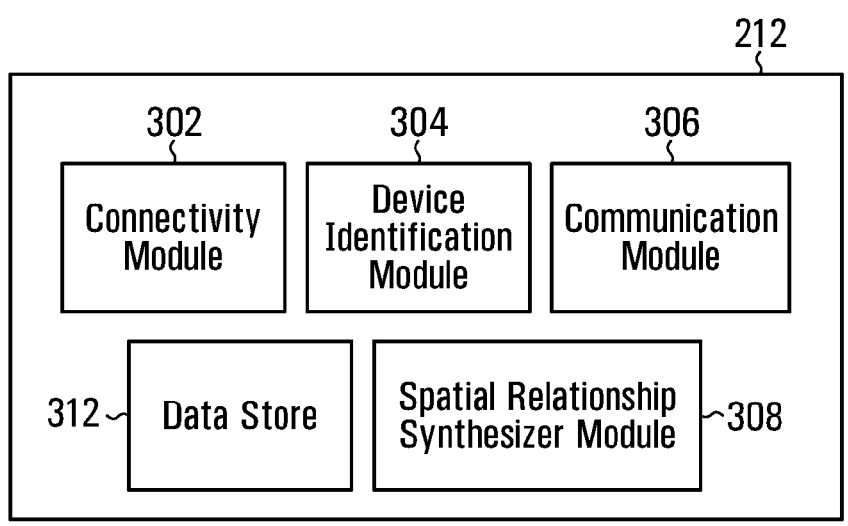
FIG. 3 is a block diagram of example software components in the first mobile computing device of FIG. 1 for maintaining connectivity data of at least one other interconnected device, according to an embodiment.

FIG. 3 illustrates an organizational block diagram of software components at device 100 as stored within the memory of FIG. 2 for allowing detection of spatial relationships for other interconnected mobile devices (e.g. device 102). As illustrated, the software components include a connectivity module 302, a device identification module 304, a communication module 306, a spatial relationship synthesizer module 308, and a data store 312. The data store 312 includes information related to one or more of: connectivity, device and connector information for the device 100.

Devices 100 and 102 shown in FIG. 1 have been illustrated with particular exemplary connector and device layout configurations. As discussed herein, alternate configurations/layout/positioning can be envisaged for the connectors and alternate size/layout of the device can also be envisaged. Similarly, although a single interconnected device (e.g. 102) is shown in FIG. 1 for illustrative purposes, multiple interconnected devices can be envisaged having alternate connector configurations/layout/positioning and alternate size/layout of device 100. Alternate embodiments of exemplary devices are shown in FIGS. 7-12 and 13A to 13D.

Connectivity module 302 operates in conjunction with connectors 108, and coordinates detection of when a connection in made or lost at each of the connectors 108 on the device 100. Connectivity module 302 further maintains the data store 312 which includes connectivity information that indicates whether a connection exists for each of the connectors 108 on the mobile device 100. Data store 312 may have any suitable format within memory 312. Further, in response to sensing when a new connection is made or lost with a particular connector 108, the connectivity module 302 is configured to update the connectivity information in data store 312. Examples of such connectivity information are shown within the data store 312 in FIG. 4.

A device identification module 304 is configured to store connector information including a pre-defined physical location of each of the connectors relative to the device (e.g. x-y parameters indicating location; general location parameters-TOP, BOTTOM, RIGHT, and LEFT) within the memory 212. The pre-defined physical location of each of the connectors may be defined upon fabrication and/or programming of the device 100 and/or connectors 108.

Device identification module 304 is further configured to maintain and/or update device information such as but not limited to: a type of connectors 108; potential types of devices that can be coupled to each connector 108 (e.g. smartphone, peripheral devices, etc.) within the memory 212. Each connector's 108 relative physical location is preferably known with respect to a coordinate system attached to the device 100 (e.g. in mm from a defined corner). Examples of connector information indicating relative location of connectors 108 is shown in the data store 312 of FIG. 4.

Additionally, in one embodiment, device identification module 304 further includes device information such as but not limited to: size of device (e.g. 100 mm×200 mm), type of device (e.g. model), display screen 100 characteristics (e.g. pixel size, pixel color depth, pitch, etc.) and other device information that may be used to derive spatial information. In another exemplary embodiment, the device identification module 304 further includes information about the location of touch sensors on device 100 (e.g. relative to the device's coordinate system). The device information may be stored in the memory 212. The location information of the touch sensors) which may be pre-defined (e.g. upon fabrication and/or programming of the device 100) and stored within the memory 212.

Thus, based on the connector information provided by device identification module 304 (e.g. connector locations on the device), device type, device size, and touch screen information), connectivity module 302 can determine the relative spatial location of each of the other devices interconnected to mobile device 100. In the example configuration of FIG. 1, the connectivity module 302 indicates, via the information in data store 312 shown in FIG. 4 that the interconnected device 102 is located on the right side of device 100. Additional information (e.g. device type, device size, and touch screen information) can be used by the connectivity module 302 to further refine the determined relative spatial location of each of the other devices interconnected to the mobile device 100 and for use by software applications of the devices for processing input/output display operations (e.g. determining merging of the multiple display screens for screen stitching).

Figure 4:
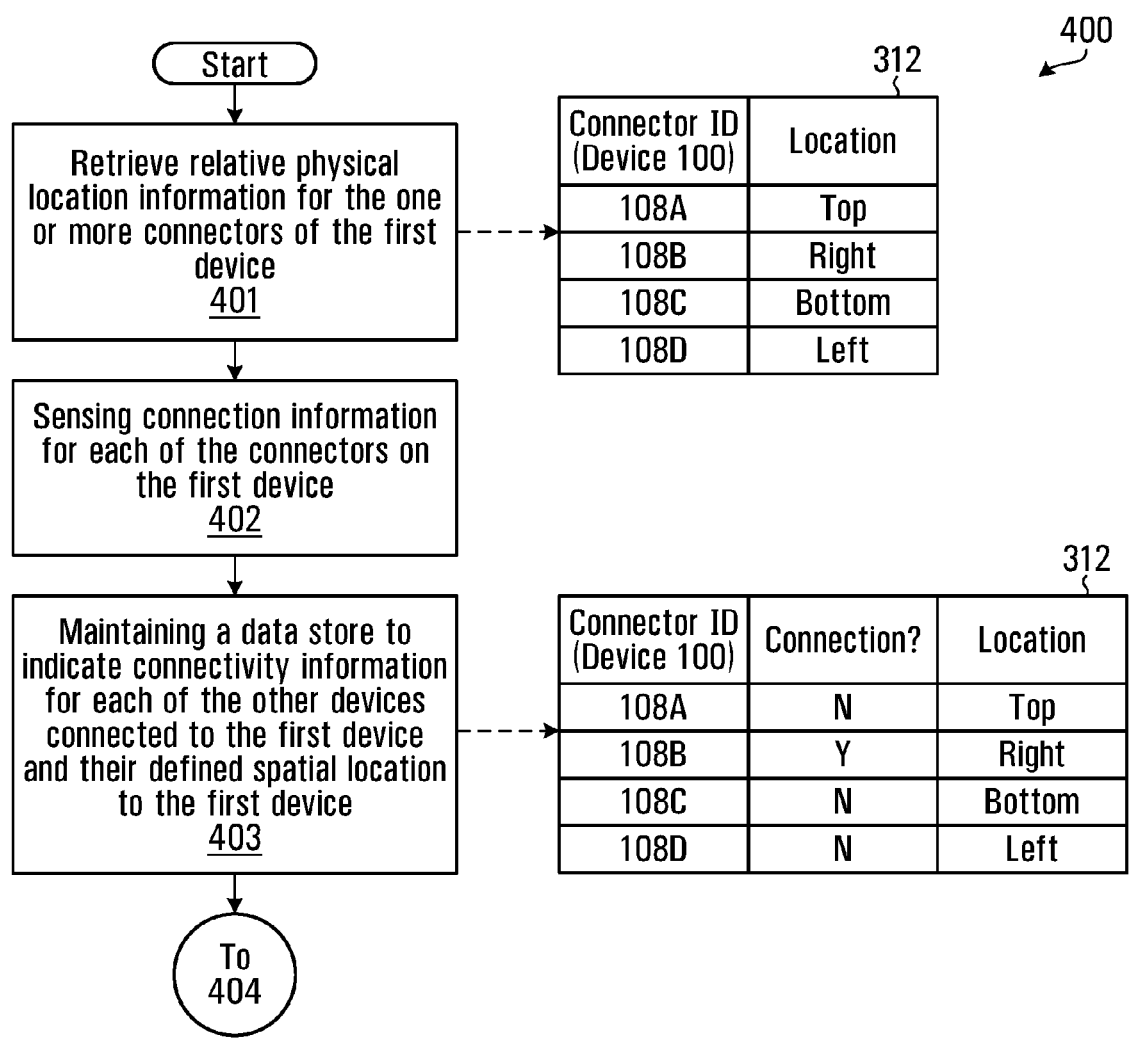
FIGS. 4 and 5 are flow charts illustrating a process implemented by the first mobile computing device of FIGS. 2-3 to determine the spatial location of interconnected mobile computing devices, according to an embodiment.
Figure 5:
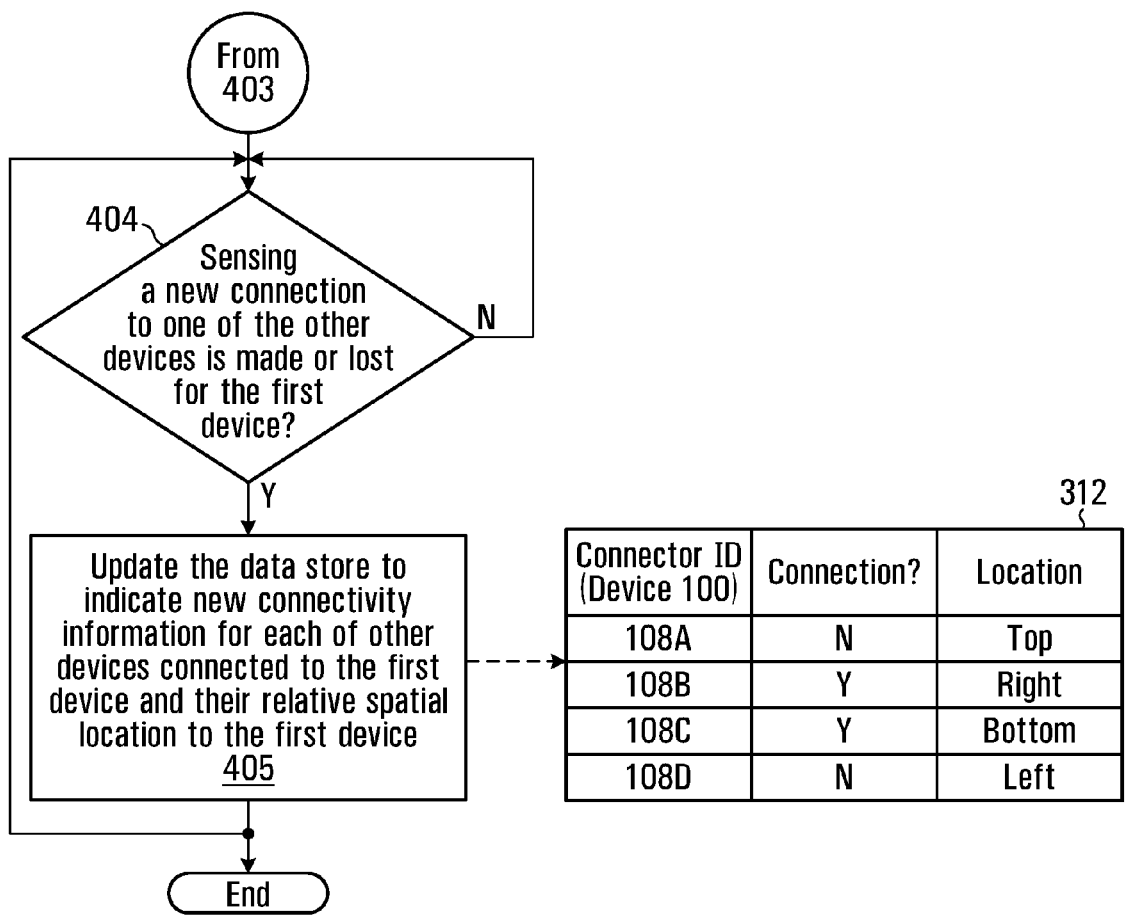

FIGS. 4 and 5 show flowcharts which depict the blocks 400 for detecting relative spatial locations for one or more devices (e.g. device 102) interconnected to first device 100 via one or more connectors 108 on first device 100. Blocks 400 can be implemented by the modules 302, 304 and may operate on data store 312 shown in FIG. 3.

Blocks 400 are considered from the perspective of the first mobile device 100. At block 401, the relative physical location information for the one or more connectors 108 of first device 100 is retrieved via the device identification module 304 from the memory 212. An example of the location information for the connectors 108 on the device 100 is shown within the data store 312.

At block 402, device 100 senses connection information for each of the connectors 108 on the first device 100 (e.g. via the connectivity module 302). That is, each of the plurality of connectors 108 is configured to sense when connection to one of the other interconnected devices is made or lost. In the depicted embodiment, an electrical connection may be sensed (e.g. an electrical coupling of a connector 108 to another complementary connector). Alternatively, or additionally, however, a mechanical coupling to another connector could be sensed (e.g. by way of a proximity detector/switch), or the establishment of a communication connection (e.g. a serial link, by way of USB bus) could be detected. As required, data store 312 could store additional information about the type of connection for each connector 108. As will be appreciated, the connection of connectors 108 may be sensed directly at the connectors 108 via the different sensing techniques discussed above (such as changes in the electrical characteristics at the electrical contacts of the connectors or detection of EHF signals communicated via the connectors 108), or alternatively via one or more sensors, such as a pressure sensor located on the device 100 for detecting physical connectivity between the connectors 108 to the connectors 112. Additionally, this connectivity information may be communicated through an appropriate software driver responsible for the connectors 108 (e.g. a communications driver, serial bus driver, or the like).

At block 403, data store 312 is maintained to indicate connectivity information for each of the other devices (e.g. 102) connected to device 100. Based on the connectivity information, the relative spatial location of each of the other devices (e.g. device 102) interconnected to the mobile device 100 is determined at block 403 (via the connectivity module 302). As shown, data store 312 may store that connector 108B is located on the right hand side of device 108 has an active connection and thus it can be determined that the relative spatial location of the second device 102 is on the right hand side of device 100. Optionally, data store 312 need not directly store available spatial information about each connector 108, but may be linked to it (e.g. by way of pointer, or identifier of each connector 108)

After initial formation of data store 312—for example at power up—device 100 may sense whether a new connection has been made or lost for one of connectors 108 with one or more interconnected devices (e.g. via the connectivity module 302), as further detailed in FIG. 5. In block 404, device 100 senses a new connection at connectors 108. If no new connection is sensed, device 100 continues sensing whether any of its associated connectors made or lost a connection. If a new connection is detected, device 100 proceeds to block 405, where data store 312 is updated to reflect new connectivity information based on the newly sensed connection that is made or lost with an interconnected device. In the updated data store 312 of FIG. 5, the connectivity information indicates that a second connector 108C, located at the bottom of the device 100 has formed a new connection and thus that another device is spatially located on the bottom side of the device 100.

In the example of FIG. 1, devices 100 and 102 are connected by way of connector 108A on device 100 and connector 112C located on device 102. In this example, from the perspective of the device 100, device 100 is aware of a connection made at connector 108A (e.g. as identified at block 402 of FIG. 4). Further, based on the knowledge of the location of connector 108A (e.g. as identified at block 401 of FIG. 4), device 100 may determine, via the connectivity information for the device 100 that interconnected device 102 is located on the right side of the device 100.

After initial connection of devices 100, 102 then either device may optionally obtain additional information from interconnected other devices to augment its connectivity information and spatial awareness.

Device type and additional information may be exchanged via a communication link (e.g. near field communication protocol), an established communications connection (e.g. serial link, etc.) over connectors 108/112 or otherwise, to allow further exchange of information between devices 100 and 102. The additional information can, for example, be provided by each interconnected device 102 via communication module 306, in response to receiving a request from device 100, as part of a handshaking communication between device 100 and device 102, or otherwise.

As noted, the additional information for improving and further refining the spatial awareness of an interconnected device can include the size of the interconnected device, the type of the interconnected device, the device ID and relative physical location of connectors on the interconnected device (e.g. device 102). In some embodiments, the device ID can be used for distinguishing between when two connectors of a first device 100 are both connected: i) to the same second device such as device 102 (e.g. see FIG. 9) or alternately ii) each to different devices (e.g. see FIG. 10).

Figure 6:
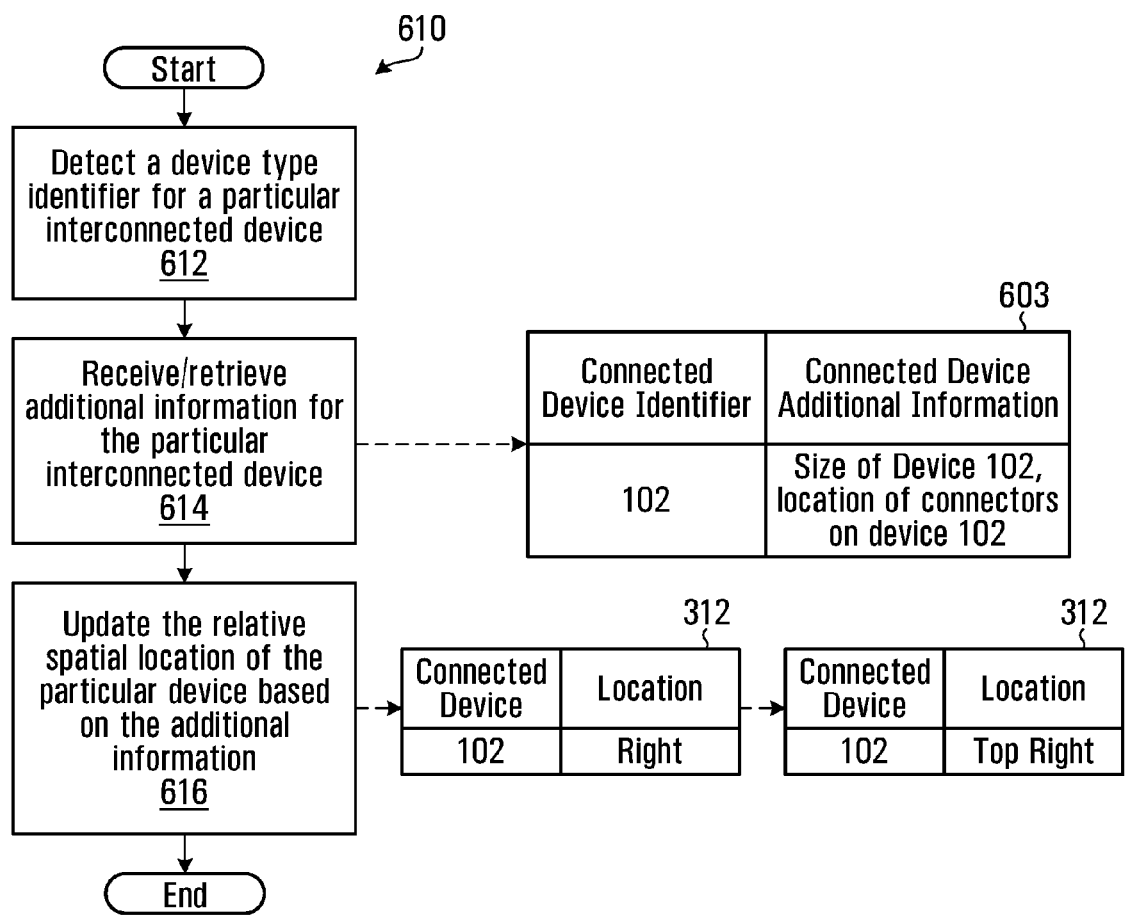
FIG. 6 is a flow chart illustrating a process for receiving additional spatial information from a particular interconnected device connected to the first mobile computing device of FIG. 1 for determining the spatial location of the particular interconnected device, in accordance with an embodiment.

To that end, FIG. 6 is a flowchart of blocks 610 performed by device 100 to acquire additional connectivity information for a particular one of the interconnected devices connected to the device 100. The additional connectivity information may be retrieved from the particular device and/or from a database stored on an external server (e.g. a cloud-based database). The additional information may be stored in a further a data store 603 at device 100, as discussed herein, can include information relating to the size of any particular interconnected device (e.g. device 102) and the relative location of the respective connectors 112. Data store 603 can be stored in memory 212 in FIG. 3, and need not have any particular structure.

As illustrated, at block 612, device 100 may receive a device type identifier from device 102. In block 614, device 100 may receive additional information from interconnected device 102 that may be used in updating data store 312. Alternatively, device 100 may retrieve additional spatial information for the interconnected device 102 from another source (e.g. from pre-stored parameters in memory or from an external source) based on the device type identifier of device 102. The pre-stored parameters may include form-factor information about device 102 including the screen size, resolution, location of connectors, and the like.

At block 616, based on the additional information, the connectivity information of the particular interconnected device 102 may be augmented and may be used to further increase the spatial awareness of device 102. In the example shown, the initial connectivity information for device 102 was originally estimated as located on the "right" side (see data store 312 in FIG. 6). Once updated, connectivity information indicates that the relative spatial location of device 102 is the top right side of device 100. In one example, the connectivity information may indicate the dimensions of device 102, in pixels or in mm and the location of its connectors 112.

Additionally, device 102 may also provide information about other devices interconnected to it. For example, if device 102 maintains connectivity information indicative of other interconnected devices, including spatial information—like that maintained in data store 312 of device 100—device 102 may provide such information about other interconnected devices to device 100. Device 100 may use this additional information to further augment its spatial awareness, and determine the relative spatial location of the addition devices, relative to device 100.

Referring again to FIG. 3, in one embodiment, device 100 further includes a spatial relationship synthesizer module 308 stored in the memory 212. The synthesizer module 308 consolidates connectivity and other information received by one or more of modules 302, 304, and 306 to determine how to process input and output received on the device 100 relative to multiple input and output screens provided by the interconnected device(s) (e.g. device 102). For example, once the relative spatial location of each interconnected device (e.g. device 102) is determined relative to the first device 100, this information can be useful for stitching together multiple displays (e.g. determining how to divide image data to span displays 110 on devices 100 and 102).

In one example, module 308 is configured to collect information regarding the location of displays on each device (e.g. device 100) and display parameters (e.g. resolution, pixel pitch, and display dimensions) in order to synthesize outputs onto multiple interconnected displays (e.g. displays 110 of device 100 and 102) and/or to process the inputs obtained via an interconnected display based on the display parameters and the location of the displays on each device 100, 102 and/or inputs obtained via each of the interconnected displays.

Other functionalities of the relationship synthesizer module 308 can include processing gestures across multiple devices or spanning an output display across a selected number of interconnected device displays, to allow rendering of graphics on a larger display surface.

Figure 7:
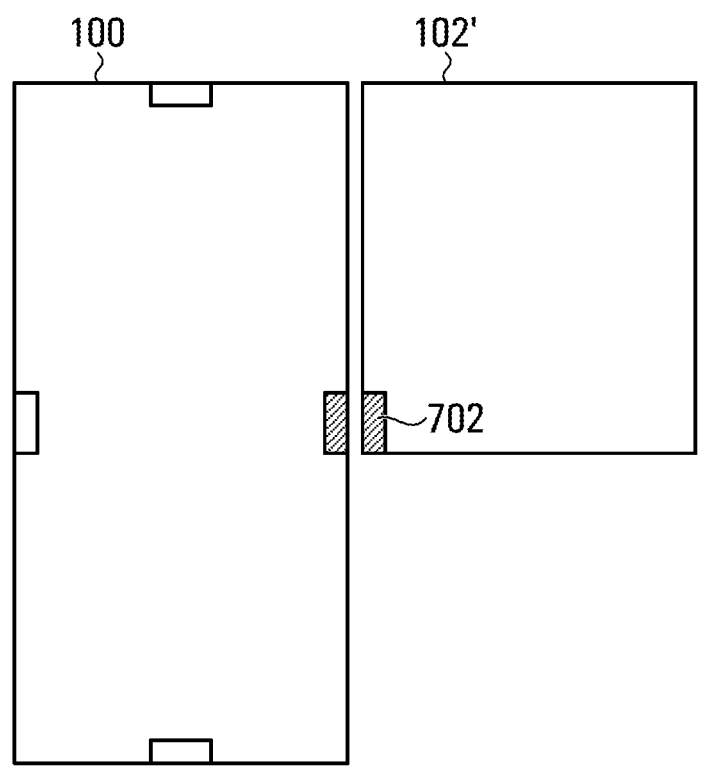
FIGS. 7-12 are block diagrams of example interconnected mobile devices, for which spatial relationships may be determined, in accordance with an embodiment.
Figure 8:
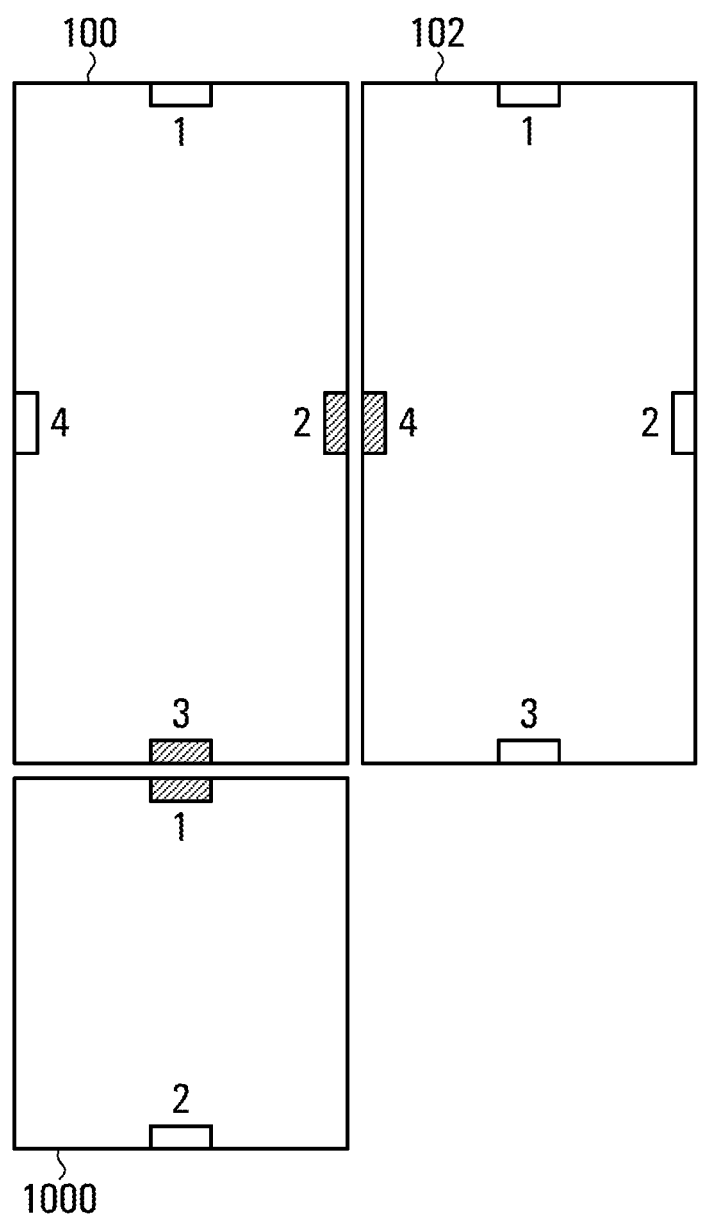
Figure 10:
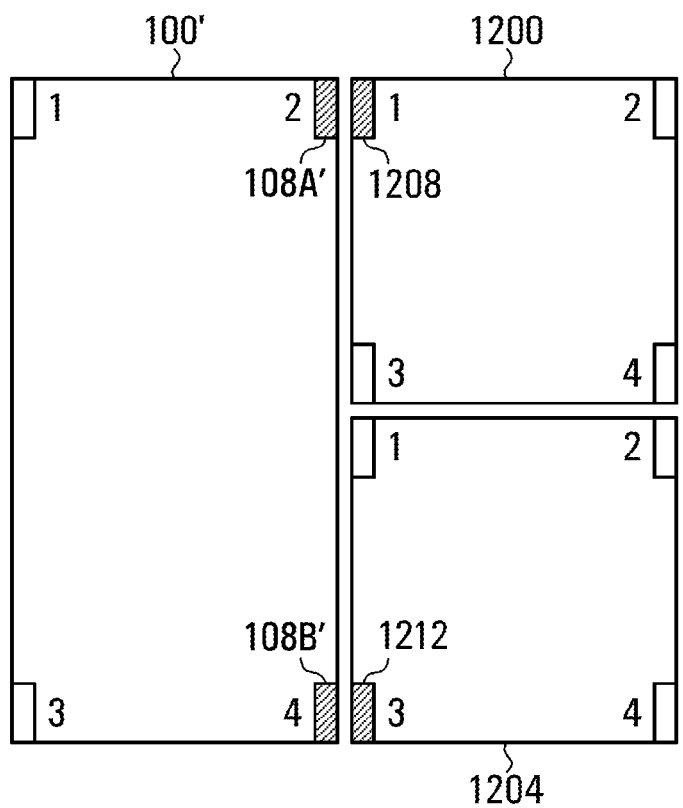
Figure 11:
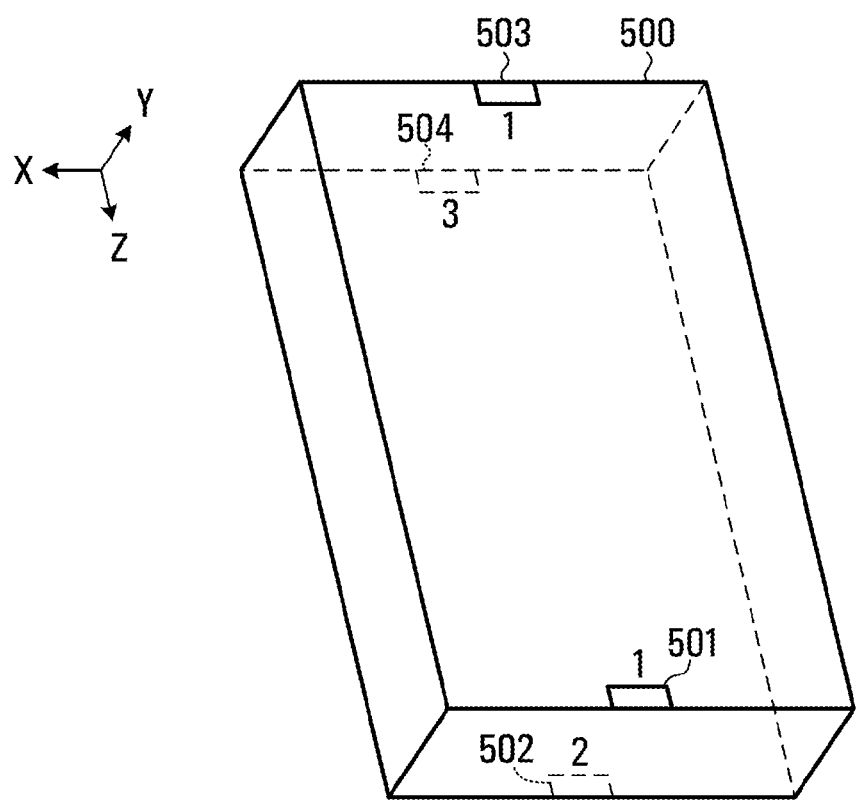

As will be appreciated, determining spatial relationships based on connectivity information as described herein may allow device 100 to detect a wide variety of spatial configurations with other devices. For example, the relative spatial location of different sized interconnected device 102' (connected to connector 108B through connector 702) as illustrated in FIG. 7 may be determined and maintained at device 100. Likewise, the spatial relationship and relative spatial locations of multiple interconnected devices (e.g. device 100, 102, and 1000; or devices 100', 1200 and 1204), connected at different connectors, as depicted in FIGS. 8 and 11 may be determined and maintained at device 100/100'. Similarly, the spatial relationship of devices concurrently connected by multiple connectors as depicted in FIGS. 9 and 10 may be determined. In the example of FIG. 9, the device 100' is connected by way of connectors 108A' and 108B' (collectively 108') to the device 102" by way of respective connectors 112A" and 112B" (collectively 112"). Similarly, in the example of FIG. 10, the device 100' is connected by way of the connectors 108A' and 108B' to devices 1200 and 1204 via respective connectors 1208 and 1212 as shown. Additionally, spatial relationship may be determined in more than two dimensions. For example, as illustrated in FIGS. 11 and 12, connectors (501-504) on the tops and bottom of interconnected devices 500 may be used to determine the spatial interconnections of devices in multiple planes, allowing the detection of devices positioned atop one another, as depicted in FIG. 12.

Figure 13A:
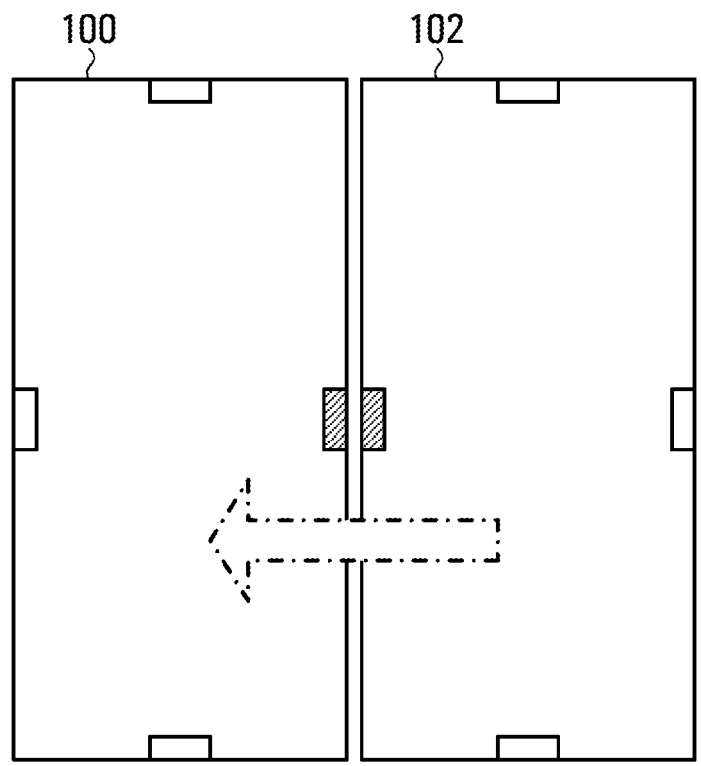
FIGS. 13A-13D are block diagrams of example interconnected mobile devices in use.
Figure 13B:
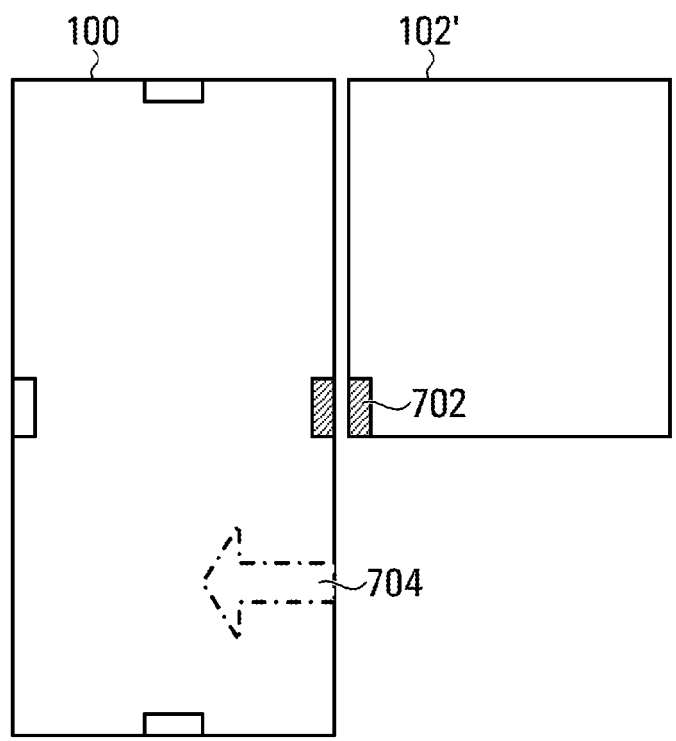
Figure 13C:
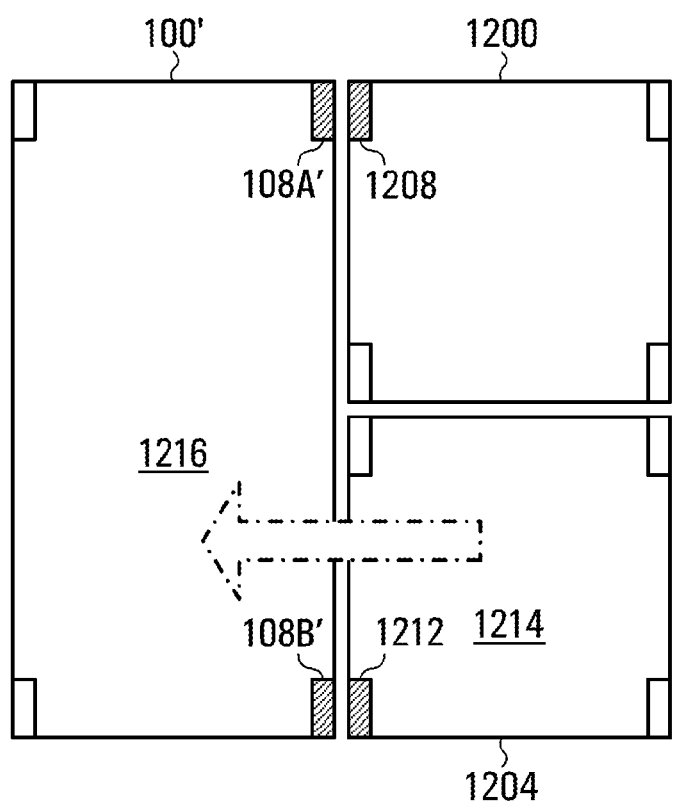

Knowledge of relative spatial locations may be used in any number of ways. For example, this spatial location and awareness information may be used in processing inputs, such as an input on a touch screen of the device. As for example depicted in FIGS. 13A-13D cross-device gestures (e.g. 704) may be detected as such. As depicted in FIG. 13A knowledge of the presence of device 102 to the right of device 100 may, for example, be used by device 100 to determine if a gesture was initiated on an adjacent device 102. Complementary connectivity information at device 102 may be used to determine if a gesture concludes at device 100. By contrast, knowledge of an interconnected smaller device 102' as depicted in FIG. 13B may allow device 100 to exclude the possibility of certain gestures originated at device 102' (e.g. by way of knowledge of the connector 702 location on the device 102'). Likewise, possible cross-device gestures as illustrated in FIGS. 13C and 13D could be detected (e.g. as received on respective displays 1214 and 1216) and processed as such, possibly at any of the interconnected devices 100', 1200 and 1204 (e.g. via connection information for the devices 100', 1200 and 1204 as well as additional knowledge of connector locations 108A', 108B', 1208, and 1212).

Figure 13D:
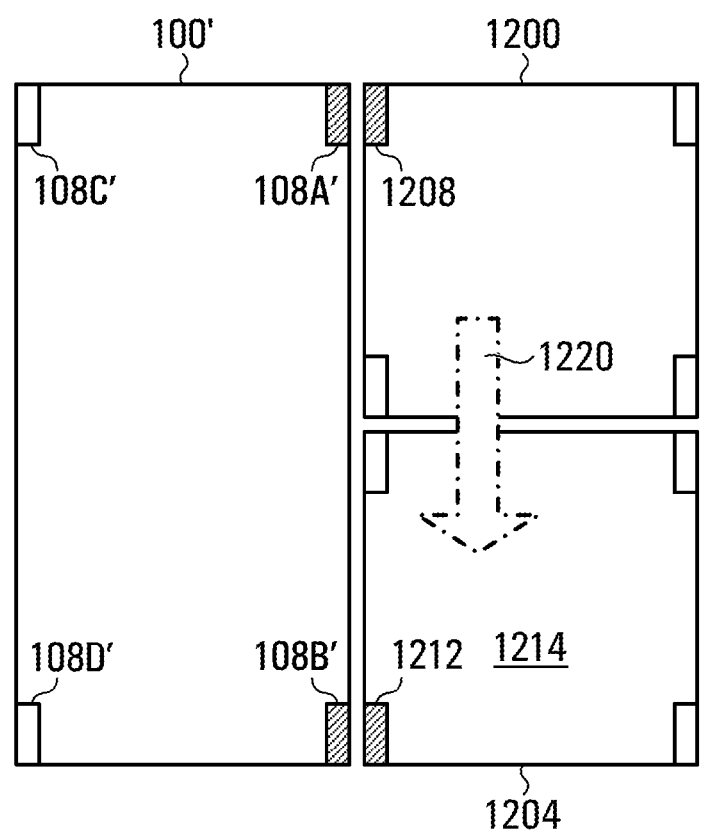

Referring to FIG. 13D, shown is a gesture received on a plurality of devices (e.g. 1200 and 1204) interconnected to the device 100' but not physically connected to one another. That is, the device 100' includes four connectors 108A', 108B', 108C' and 108D' and is connected by way of connectors 108A' and 108B' to respective devices 1200 and 1204. In one embodiment, the communication module 306 of device 100' (see FIG. 3) is configured to relay additional spatial information (e.g. understanding of the spatial relationship between device 100' and the interconnected devices 1200 and/or 1204) to one or both of the interconnected devices 1200 and 1204. In this way, the interconnected device 1200 gains knowledge of its spatial relationship to device 1204, and vice versa although the devices 1200 and 1204 may not be physically connected via respective connectors. Thus, each of the devices 1200 and 1204 may utilize the relative spatial location information of the devices 100', 1200, and 1204 such as to allow improved data communication (e.g. wirelessly or through other communication channels) for cross device interaction. This improved spatial awareness can assist devices 1200 and 1204 for interpreting an input gesture 1220 spanning across devices 1200 and 1204 as shown in FIG. 13D.

Figure 14:
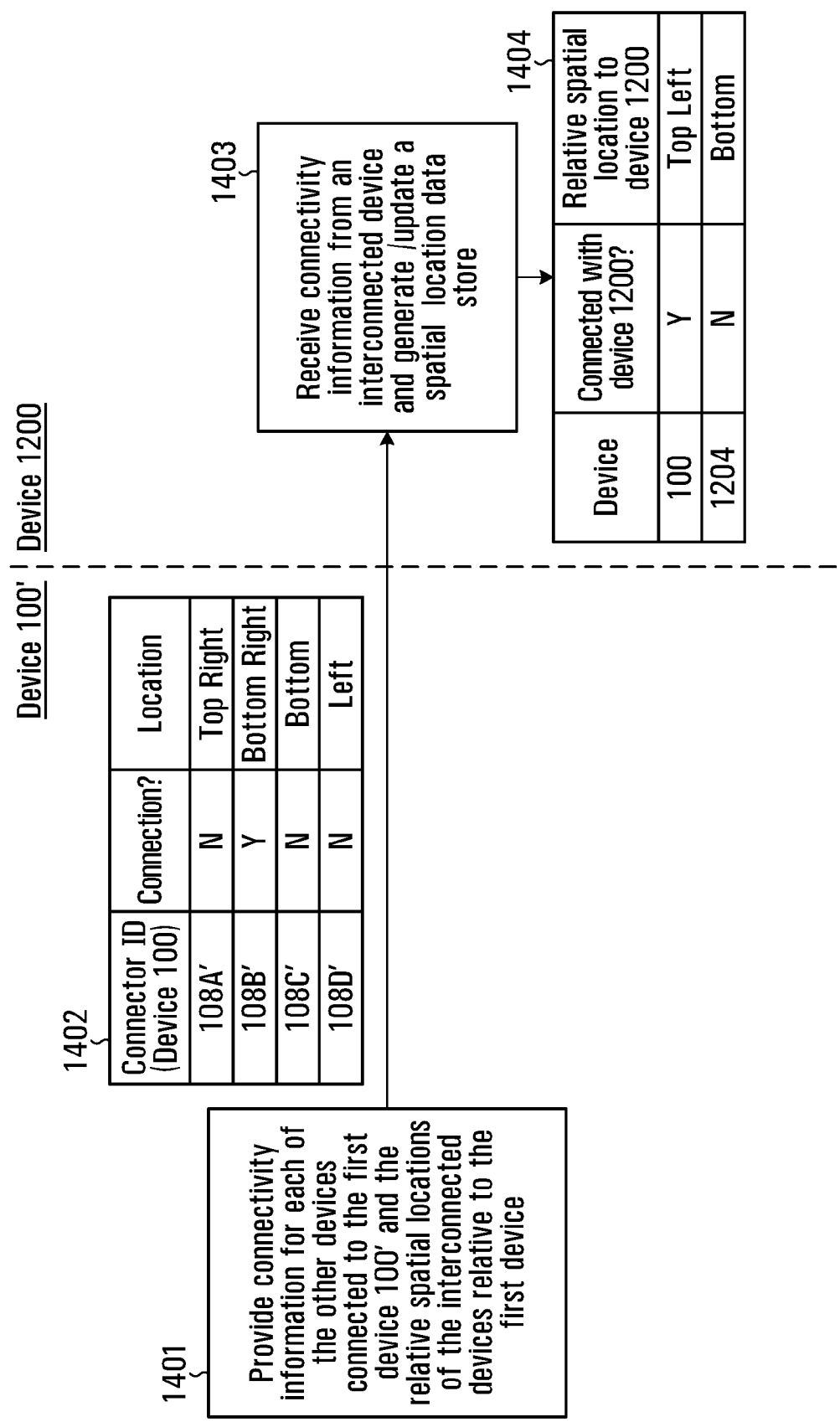
FIG. 14 is a flow chart illustrating a process for providing spatial information to one of the interconnected mobile devices shown in FIG. 13D.

An example flowchart is illustrated in FIG. 14 which depicts the communication between the device 100' and one or more interconnected devices 1200 and 1204 as depicted in FIG. 13D to relay the spatial location information contained therein. As illustrated in FIG. 14, at block 1401, the device 100' relays example connectivity information 1402 (as determined by the connectivity module 302 of the device 100') to one or more interconnected devices (e.g. 1200). In the illustrated example, the connectivity information 1402 indicates the connection information for each of the other devices (e.g. 1200 and 1204) interconnected to the device 100' and their relative spatial locations with respect to the device 100'. At block 1403, the device 1200 receives the connectivity information 1402 from the interconnected device 100' and generates and/or updates a spatial location data store 1404 which indicates the relative spatial locations of devices interconnected to device 1200 and those devices connected to the interconnected device 100' (e.g. device 1204) but not directly connected to the device 1200. The relative spatial location information relating to the devices interconnected to the device 100' may be maintained on the device 1200 (e.g. on a local memory) and updated to include additional information provided by interconnected device 100'.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art.

The invention claimed is:

1. A mobile device comprising:
   a. a plurality of magnetic connectors each for magnetically interconnecting with another device of a plurality of other devices, each of the plurality of magnetic connectors located in a defined relative physical location on the mobile device and each of the plurality of magnetic connectors configured to sense when a magnetic connection to a magnetic connector of one of the other devices is made or lost, and provide indicators thereof;
   b. a processor;
   c. an interface communicatively coupling the magnetic connectors to the processor to allow the plurality of magnetic connectors to communicate the indicators;
   d. a memory, the memory storing instructions that cause the processor to:
      maintain a data store that indicates connectivity information for each of the other devices that are magnetically interconnected to the mobile device;
      determine a relative spatial location of each of the other interconnected devices relative to the mobile device based on the relative physical location of the plurality of magnetic connectors and the connectivity information; and
      update the data store to reflect when connection to one of the other devices by way of one of the plurality of magnetic connectors is made or lost based on the indicators from respective one or more of said plurality of magnetic connectors.

2. The mobile device of claim 1, further comprising establishing a communication link to one of said plurality of other devices by way of one of said plurality of magnetic connectors.

3. The mobile device of claim 2, wherein said communication link is a serial link.

4. The mobile device of claim 3, wherein said serial link is on a universal serial bus (USB).

5. The mobile device of claim 1, wherein the memory further stores instructions to:
   receive additional information from a particular device of said other devices, said additional information comprising at least one of: a size of said particular device, and the physical location of respective magnetic connectors on said particular device that are connected to said mobile device; and
   refining the determined relative spatial location of said particular device relative to the mobile device, in further dependence upon the additional information.

6. The mobile device of claim 1, wherein the memory further stores instructions to:
   receive additional connectivity information for a particular device of said other devices indicating connections made between said particular device and associated other devices; and,
   update the connectivity information at said mobile device to reflect said additional connectivity information; and
   determine the relative spatial location of said associated other devices relative to said mobile device.

7. The mobile device of claim 6 wherein the additional connectivity information is received from at least one of: the particular device and a cloud-based database using a device type ID for the particular device.

8. The mobile device of claim 1, wherein the magnetic connectors for interconnecting with another device further provide an electrical connection.

9. The mobile device of claim 1, wherein said processor is further operable to sense when a connection is made or lost at one of said plurality of magnetic connectors.

10. The mobile device of claim 1, wherein the memory further stores instructions to cause said processor to:
    determine a device type identifier for said another device;
    determine from said device type identifier additional form-factor information for said another device; and
    update the connectivity information, in further dependence upon the additional form-factor information obtained for said another device.

11. The mobile device of claim 1 further comprising a touch screen and wherein the memory further stores instructions to:
    receive an input gesture on said touch screen;

assess if said input gesture originated or terminated at an adjacent one of said other devices based on said connectivity information.

12. The mobile device of claim 1 wherein the memory further stores instructions to cause said mobile device to act as a master in a master-slave relationship to said other devices.

13. The mobile device of claim 1 further comprising a display screen and the memory further storing instructions to output graphics spanning said display screen of said mobile device, and a display screen of a magnetically interconnected one of said other devices.

14. The mobile device of claim 1, wherein the memory further stores instructions to:
provide connectivity information for the mobile device to one of said other magnetically interconnected devices to indicate relative spatial locations of each of the other magnetically interconnected devices for subsequent use by said one magnetically interconnected device for determining relative spatial locations of devices only magnetically connected to the mobile device.

15. A computer-implemented method of detecting a relative spatial location between a mobile device and another device of a plurality of other devices connected to the mobile device, the method comprising:
a. receiving from a particular magnetic connector of a plurality of magnetic connectors on the mobile device, an indicator indicating connectivity of the particular magnetic connector with a corresponding magnetic connector of said another device, the particular magnetic connector of said plurality of magnetic connectors located in a defined relative physical location on the mobile device; and
b. in response to receiving said indicator from said particular magnetic connector, updating connectivity information in a data store for the mobile device to indicate a magnetic connection made or lost with the particular magnetic connector, wherein the connectivity information is configured for determination of the relative spatial location of said another device relative to the mobile device.

16. A computer-implemented method comprising:
a. sensing, at a mobile device, when connection between the mobile device and another device is made or lost, wherein the mobile device comprises a plurality of magnetic connectors for interconnecting with respective magnetic connectors of said another device of a plurality of other devices and the plurality of magnetic connectors are each located in a defined relative physical location on the mobile device, wherein each of the plurality of magnetic connectors is configured to sense when a magnetic connection to a magnetic connector of one of the other devices is made or lost, and provide indicators thereof;
b. maintaining a data store that indicates connectivity information for each of the other devices that are interconnected to the mobile device by way of said plurality of magnetic connectors;
c. determining a relative spatial location of each of the other interconnected devices relative to the mobile device based on the defined relative physical location of the plurality of magnetic connectors and the connectivity information; and
d. updating the data store to reflect when connection to one of the other devices by way of one of the plurality of magnetic connectors is made or lost, as signaled by the indicators from respective one or more of said plurality of magnetic connectors.

17. The method of claim 16, further comprising establishing a communication link to one of said plurality of other devices by way of one of said plurality of magnetic connectors.

18. The method of claim 17, wherein said communication link is on a universal serial bus (USB).

19. The method of claim 16, further comprising:
receiving additional information from a particular device of said other devices, said additional information comprising at least one of: size of said particular device, and physical location of respective magnetic connectors on said particular device that are connected to said mobile device; and
refining the determined relative spatial location of said particular device relative to the mobile device, in further dependence upon the additional information.

20. The method of claim 16, further comprising:
receiving additional connectivity information for a particular device of said other devices indicating connections made between said particular device and associated other devices; and,
updating the connectivity information at said mobile device to reflect said additional connectivity information; and
determining the relative spatial location of said associated other devices relative to said mobile device.

21. The method of claim 20 wherein the additional connectivity information is received from at least one of: the particular device and a cloud-based database using a device type ID for the particular device.

22. The method of claim 20, wherein the magnetic connectors for interconnecting with another device further provide an electrical connection.

23. The method of claim 20, further comprising sensing when a connection is made or lost at one of said plurality of magnetic connectors.

24. The method of claim 20, further comprising:
determining a device type identifier for said another device;
determining from said device type identifier additional form-factor information for said another device; and
updating the connectivity information, in further dependence upon the additional form-factor information obtained for said another device.

25. The method of claim 20, further comprising:
receiving an input gesture on a touch screen;
assessing if said input gesture originated or terminated at an adjacent one of said other devices based on said connectivity information.

26. The method of claim 20, further comprising: serving as a master in a master-slave relationship with said other devices.

* * * * *